(No Model.)
E. SIMON.
HANDLE FOR SATCHELS, BAGS, &c.
No. 270,852. Patented Jan. 16, 1883.
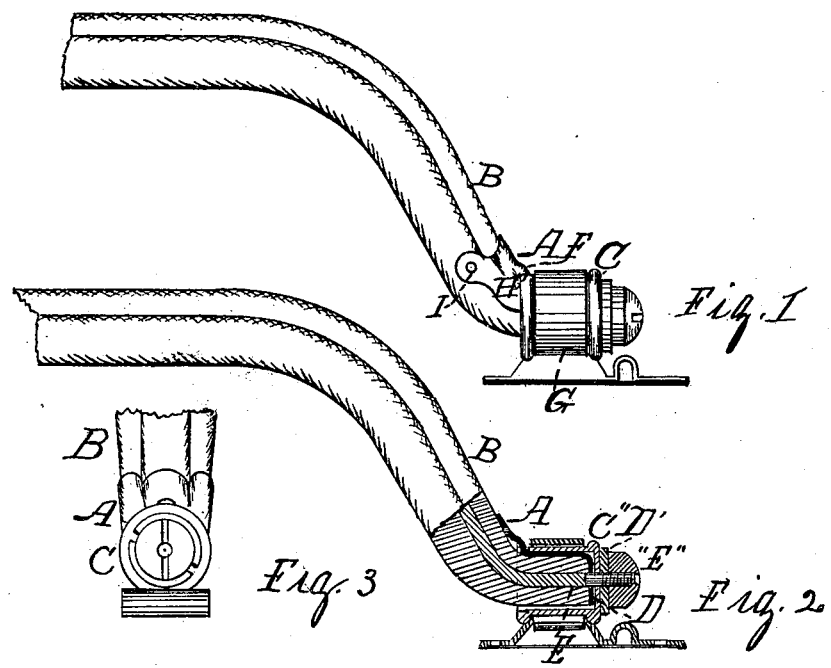
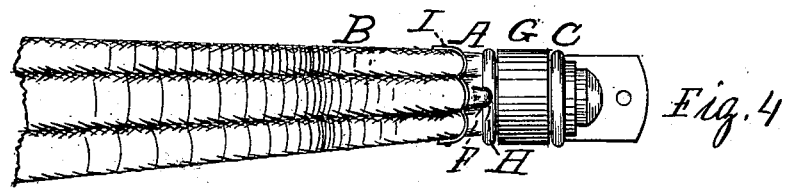
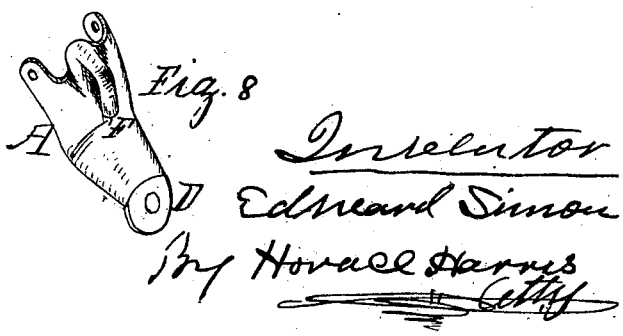
Witnesses
R. S. Steadman
J. H. Couselyea
Inventor
Edward Simon
By Horace Harris
Atty

UNITED STATES PATENT OFFICE.

EDWARD SIMON, OF NEWARK, NEW JERSEY.

HANDLE FOR SATCHELS, BAGS, &c.

SPECIFICATION forming part of Letters Patent No. 270,852, dated January 16, 1883.

Application filed November 27, 1882. (No model.)

*To all whom it may concern:*

Be it known that I, EDWARD SIMON, of Newark, in the county of Essex and State of New Jersey, have invented a new and useful Improvement in Handles for Satchels, Bags, &c., of which the following is a specification.

My invention relates to an improvement in the manufacture of handles for satchels, bags, &c., wherein I give greater security to the connection between the handle and the bag, &c., and add an additional element of ornamentation; and it consists in the devices substantially as hereinafter set forth.

Figure 1 is a side elevation. Fig. 2 is the same partly in section. Fig. 3 is an end view. Fig. 4 is a plan, and Figs. 5, 6, 7, and 8 are detailed views.

In my construction, in connection with my devices as shown in my Patent No. 229,481, of June 20, 1880, I attach a washer-guard, A, by means of the pin I to the handle B under the handle-cap C, and extend it so that the end D is bent over the end of the handle, the wire E passing through this section D. This guard is made with the projection F on the top adapted to fit in a notch, H, in the handle-cap C. This causes the cap to turn with the handle in the clasp-strap G, and prevents the wearing of the handle, as in the former patent, by the contact of the sharp edge of the cap C, as the handle in that patent turned inside the cap. This guard being fast to the handle, and having a section, D, extending over the end of it, prevents any liability of the parts being separated or becoming shackling if the nuts D or E should be removed or loosened; and this washer-guard, in addition to the protection and strength it affords to the handle connection, becomes an additional element of ornamentation.

Having described my improvement, I claim—

In combination with the handle B and handle-cap C, the guard A, substantially as and for the purpose specified.

EDWARD SIMON.

Witnesses:
HORACE HARRIS,
I. P. FRINK.